United States Patent
Li et al.

(10) Patent No.: US 11,448,152 B2
(45) Date of Patent: Sep. 20, 2022

(54) SYSTEMS AND METHODS FOR ENGINE AIR FILTER SYSTEM DIAGNOSTICS

(71) Applicant: GM GLOBAL TECHNOLOGY OPERATIONS LLC, Detroit, MI (US)

(72) Inventors: Lei Li, Whitby (CA); Terry W. Ostan, Whitby (CA); Joseph K. Moore, Whitby (CA); Chong Keong Tang, Markham (CA); Gregory A. Piper, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 53 days.

(21) Appl. No.: 17/176,706

(22) Filed: Feb. 16, 2021

(65) Prior Publication Data
US 2022/0260031 A1    Aug. 18, 2022

(51) Int. Cl.
*F02D 41/22*   (2006.01)
*B60Q 9/00*   (2006.01)
*G07C 5/08*   (2006.01)
*F02M 35/024*   (2006.01)

(52) U.S. Cl.
CPC .............. *F02D 41/22* (2013.01); *B60Q 9/00* (2013.01); *F02M 35/024* (2013.01); *G07C 5/0808* (2013.01); *G07C 5/0816* (2013.01); *F02D 2200/0406* (2013.01); *F02D 2200/0414* (2013.01); *F02D 2200/70* (2013.01)

(58) Field of Classification Search
CPC ............. F02D 41/22; F02D 2200/0406; F02D 2200/0414; F02D 2200/70; B60Q 9/00; F02M 35/024; G07C 5/0808; G07C 5/0816
USPC .......... 123/184.21; 701/103, 107; 73/114.31, 73/114.32, 114.33, 114.34, 114.37
See application file for complete search history.

(56) References Cited

U.S. PATENT DOCUMENTS

2003/0060949 A1*   3/2003   Letang .................. F02D 41/221
                                                                      701/34.4

* cited by examiner

*Primary Examiner* — Hai H Huynh
(74) *Attorney, Agent, or Firm* — Quinn IP Law

(57) ABSTRACT

A method for diagnosing an air filter status includes receiving, by a controller, sensor data indicative of a mass air flow rate, an air temperature and an air pressure of an air cleaner assembly including an air filter, determining an air filter life remaining from the sensor data, and receiving data indicative of a vehicle condition. The method also includes determining when a first condition is satisfied and when true, triggering an air filter leakage alert. When the first condition is not satisfied, the controller determines when a second condition is satisfied. When the second condition is satisfied, the controller determines when a third condition is satisfied, and when the third condition is satisfied, triggers an air filter snow intrusion alert. When the second condition is satisfied and the third condition is not satisfied the controller triggers an air filter blockage alert.

20 Claims, 4 Drawing Sheets

SYSTEMS AND METHODS FOR ENGINE AIR FILTER SYSTEM DIAGNOSTICS

INTRODUCTION

The present disclosure relates generally to an engine air filter system and systems and methods for performing diagnostics of the engine air filter system.

Air filters filter particulate matter out of an air stream. For example, air filters for an engine filter particulate matter prior to the air's introduction into the combustion chamber. Over time the particulate matter accumulates and clogs the filter. A clogged air filter may lead to inefficient operation of the engine and should be replaced.

Such air filters have historically been monitored in an indirect manner to determine when they should be replaced. For example, the number of miles driven by a vehicle since its last air filter replacement is commonly used as a means for determining when it is time to replace the air filter. Using miles driven as a basis for making this determination relies on a correlation between the miles driven by the vehicle and the rate at which the vehicle's air filter clogs with particulates.

Although such a method of determining when to replace a vehicle's air filter is adequate, there is room for improvement. Accordingly, it is desirable to provide methods and systems for air filter diagnostics, including detecting leakage, missing filters, and partial or full blockage of the air filter. It is further desirable to provide methods and systems reporting the detected fault to a user. Furthermore, other desirable features and characteristics of the present disclosure will become apparent from the subsequent detailed description and the appended claims, taken in conjunction with the accompanying drawings and this background.

SUMMARY

Embodiments according to the present disclosure provide a number of advantages. For example, embodiments according to the present disclosure enable identifying an air filter leakage or blockage condition, and further, identifying whether the blockage is a snow intrusion blockage or due to other debris.

In one aspect of the present disclosure, a method for diagnosing an air filter status includes receiving, by a controller, sensor data indicative of a mass air flow rate, an air temperature and an air pressure of an air cleaner assembly including an air filter, determining, by the controller, an air filter life remaining from the sensor data, and receiving, by the controller, data indicative of a vehicle condition of a vehicle. The method includes determining, by the controller, when a first condition is satisfied. When the first condition is satisfied, the method includes triggering, by the controller, an air filter leakage alert. When the first condition is not satisfied, the method includes determining, by the controller, when a second condition is satisfied. When the second condition is satisfied, the method includes determining, by the controller, when a third condition is satisfied, and when the third condition is satisfied, triggering, by the controller, an air filter snow intrusion alert and when the third condition is not satisfied, triggering, by the controller, an air filter blockage alert.

In some aspects, the first condition is satisfied when the air filter life remaining is greater than or equal to an upper fault threshold for at least X out of Y occurrences and is greater than or equal to the upper fault threshold for a last Z occurrences.

In some aspects, the second condition is satisfied when the air filter life remaining is less than or equal to a lower fault threshold for at least x out of y occurrences and is less than or equal to the lower fault threshold for a last z occurrences.

In some aspects, the received data indicative of a vehicle condition includes an ambient temperature, a weather forecast in a vicinity of the vehicle, image data of the vicinity of the vehicle, a wiper blade condition, and a relationship between the air filter life remaining and a cumulative mass air flow of the air cleaner assembly and the third condition is satisfied when the ambient temperature is below a temperature threshold or the weather forecast indicates snow or the image data includes snow and the wiper blade condition indicates a windshield wiper in an ON position for a predetermined time.

In some aspects, the received data indicative of a vehicle condition includes an ambient temperature, a weather forecast in a vicinity of the vehicle, image data of the vicinity of the vehicle, a wiper blade condition, and a relationship between the air filter life remaining and a cumulative mass air flow of the air cleaner assembly and the third condition is satisfied when the ambient temperature is below a temperature threshold or the weather forecast indicates snow or the image data includes snow and the relationship between the air filter life remaining and the cumulative mass air flow of the air cleaner assembly has a linear slope less than a predetermined slope.

In some aspects, the received data indicative of a vehicle condition includes an ambient temperature, a weather forecast in a vicinity of the vehicle, image data of the vicinity of the vehicle, a wiper blade condition, and a relationship between the air filter life remaining and a cumulative mass air flow of the air cleaner assembly and the third condition is satisfied when the ambient temperature is below a temperature threshold or the weather forecast indicates snow or the image data includes snow, and the wiper blade condition indicates a windshield wiper in an ON position for a predetermined time, and the relationship between the air filter life remaining and the cumulative mass air flow of the air cleaner assembly has a linear slope less than a predetermined slope.

In some aspects, the method further includes generating, by the controller, a notification to an operator of the air filter leakage alert when the first condition is satisfied.

In some aspects, the method further includes generating, by the controller, a notification to an operator of the air filter snow intrusion alert when the second and third conditions are satisfied.

In some aspects, the method further includes generating, by the controller, a notification to an operator of the air filter blockage alert when the second condition is satisfied and the third condition is not satisfied.

In some aspects, the method further includes determining, by the controller, when a fourth condition is satisfied and when the fourth condition is satisfied, triggering, by the controller, an air filter end of service life alert, wherein the fourth condition is satisfied when the air filter life remaining is less than or equal to a predetermined end of filter life threshold.

In another aspect of the present disclosure, a system for diagnosing an air filter status includes a first module that, by a controller, receives sensor data indicative of a mass air flow rate, an air temperature, and an air pressure of an air cleaner assembly including an air filter and selectively computes an air filter life remaining based on the sensor data. The system also includes a second module that, by the controller, determines one of a leakage and a blockage condition by comparing the air filter life remaining to an upper fault threshold and to a lower fault threshold to determine when an air filter leakage condition, an air filter snow intrusion condition, or an air filter blockage condition exists. Determining when the air filter snow intrusion condition exists further includes receiving and evaluating data regarding one or more of an ambient temperature, a weather forecast in a vicinity of the system, image data in the vicinity of the system, a wiper blade condition, and a relationship between the air filter life remaining and a cumulative mass air flow of the air cleaner assembly. The system includes a third module that, by the controller, selectively generates at least one of a notification signal and a notification message based on the determined one of the leakage and the blockage condition.

In some aspects, comparing the air filter life remaining to the upper fault threshold includes determining when the air filter life remaining is greater than or equal to the upper fault threshold for at least X out of Y occurrences and is greater than or equal to the upper fault threshold for a last Z occurrences, and when true, triggering an air filter leakage alert.

In some aspects, comparing the air filter life remaining to the lower fault threshold includes determining when the air filter life remaining is less than or equal to the lower fault threshold for at least x out of y occurrences and less than or equal to the lower fault threshold for a last z occurrences, and when true, determining when some combination of state conditions are satisfied.

In some aspects, the state conditions include the ambient temperature is below a temperature threshold, the weather forecast in the vicinity of the system includes snow, the image data in the vicinity of the system includes snow, the wiper blade condition indicates that a windshield wiper is in an ON position for a predetermined time, and the relationship between the air filter life remaining and the cumulative mass air flow of the air cleaner assembly has a linear slope less than a predetermined slope.

In another aspect of the present disclosure, an automotive vehicle includes an air cleaner assembly including an air filter, at least one air filter sensor configured to sense a mass air flow rate, an air temperature, and a pressure condition of the air cleaner assembly, at least one vehicle sensor configured to sense a vehicle condition, at least one environmental sensor configured to sense an environmental condition in a vicinity of the vehicle, and a controller electronically coupled to the at least one air filter sensor, the at least one vehicle sensor, and the at least one environmental sensor. The controller is configured to receive sensor data from the at least one air filter sensor indicative of a mass air flow rate, an air temperature, and an air pressure of the air cleaner assembly and determine an air filter life remaining from the sensor data. The controller is also configured to receive data indicative of the vehicle condition from the at least one vehicle sensor and receive data indicative of the environmental condition from the at least one environmental sensor. The received data includes one or more of an ambient temperature, a weather forecast in a vicinity of the automotive vehicle, image data in the vicinity of the automotive vehicle, a wiper blade condition, a relationship between the air filter life remaining and a cumulative mass air flow of the air cleaner assembly, and a relationship between the air filter life remaining and a mileage of the automotive vehicle. The controller is configured to determine when a first condition is satisfied and when the first condition is satisfied, trigger an air filter leakage alert. When the first condition is not satisfied, the controller is configured to determine when a second condition is satisfied and when the second condition is satisfied, determine when a third condition is satisfied. When the third condition is satisfied, the controller is configured to trigger an air filter snow intrusion alert and when the third condition is not satisfied, trigger an air filter blockage alert.

In some aspects, the first condition is satisfied when the air filter life remaining is greater than or equal to an upper fault threshold for at least X out of Y occurrences and is greater than or equal to the upper fault threshold for a last Z occurrences, and wherein the second condition is satisfied when the air filter life remaining is less than or equal to a lower fault threshold for at least x out of y occurrences and is less than or equal to the lower fault threshold for a last z occurrences.

In some aspects, the third condition is satisfied when the ambient temperature is below a temperature threshold or the weather forecast in the vicinity of the automotive vehicle includes snow or the image data in the vicinity of the automotive vehicle includes snow and the wiper blade condition indicates a windshield wiper in an ON position for a predetermined time.

In some aspects, the third condition is satisfied when the ambient temperature is below a temperature threshold or the weather forecast in the vicinity of the automotive vehicle includes snow or the image data in the vicinity of the automotive vehicle includes snow and the relationship between the air filter life remaining and the cumulative mass air flow of the air cleaner assembly has a linear slope less than a first predetermined slope or the relationship between the air filter life remaining and the mileage of the automotive vehicle has a linear slow less than a second predetermined slope.

In some aspects, the third condition is satisfied when the ambient temperature is below a temperature threshold or the weather forecast in the vicinity of the automotive vehicle includes snow or the image data in the vicinity of the automotive vehicle includes snow, and the wiper blade condition indicates a windshield wiper in an ON position for a predetermined time, and the relationship between the air filter life remaining and the cumulative mass air flow of the air cleaner assembly has a linear slope less than a predetermined slope.

In some aspects, the controller is further configured to generate a notification to an operator of the air filter leakage alert when the first condition is satisfied, generate a notification to an operator of the air filter snow intrusion alert when the second and third conditions are satisfied, and generate a notification to an operator of the air filter blockage alert when the second condition is satisfied and the third condition is not satisfied.

BRIEF DESCRIPTION OF THE DRAWINGS

The present disclosure will be described in conjunction with the following figures, wherein like numerals denote like elements.

Figure 1:
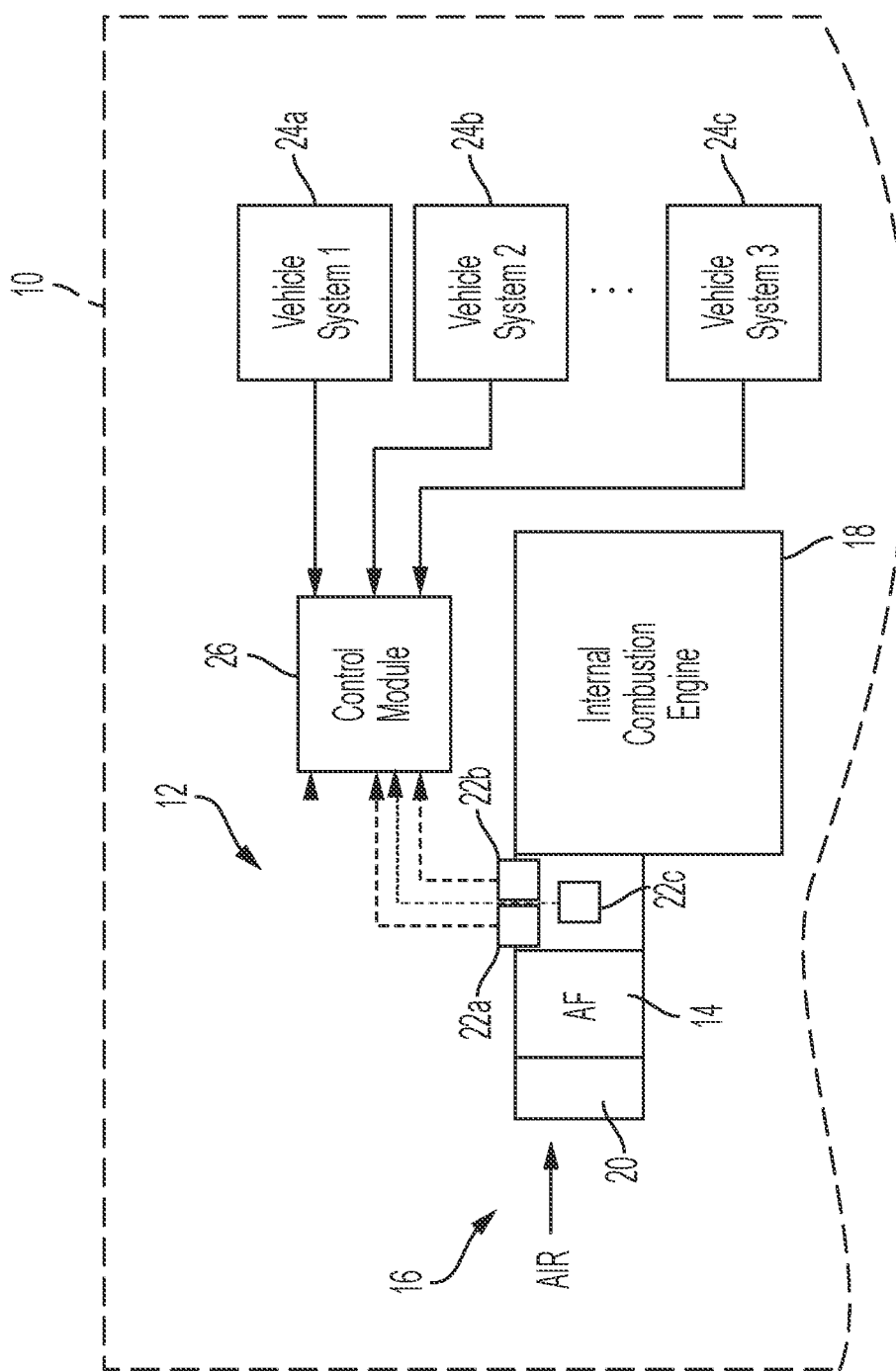
FIG. 1 is a schematic illustration of a portion of a vehicle that includes, among other features, an air filter diagnostics system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Referring now to FIG. 1, a part of a vehicle 10 is shown to include an air filter monitoring system 12 that monitors an air filter 14 of an air cleaner assembly 16, among other components, of the vehicle 10 in order to predict and notify a user of a use life of the air filter 14. Although the figures shown herein depict an example with certain arrangements of elements, additional intervening elements, devices, features, or components may be present in an actual embodiments. It should also be understood that FIG. 1 is merely illustrative and may not be drawn to scale.

As depicted in FIG. 1, the vehicle 10 generally includes the air cleaner assembly 16 that includes the air filter 14. As can be appreciated, the vehicle 10 may be any vehicle type including an automobile, an aircraft, a train, a watercraft, or any other vehicle type that includes an air filter 14. The air cleaner assembly 16 can be any air filtration system that pulls air across a filter, such as the air filter 14, and includes one or more sensors, as discussed herein. In various embodiments, the air cleaner assembly 16 is a standalone system that is separate from a vehicle, such as, for example and without limitation, stationary power generators. For exemplary purposes, the disclosure will be discussed in the context of the vehicle 10 being an automobile having an air filter 14 associated with an engine 18 of the automobile.

In operation, the air cleaner assembly 16 is configured to take air in through an inlet 20 and to direct the air to flow through the air filter 14 and then on to the engine 18. One or more sensors referred to generally as 22 sense observable conditions of the air cleaner assembly 16 and/or the vehicle 10 and generate sensor signals based thereon. One or more vehicle systems referred to generally as 24 determine a condition associated with the vehicle 10 and generate signals and/or messages based thereon.

A controller or control module 26 receives the signals from the sensors 22 and the signals and/or messages from the vehicle systems 24 and determines the use life of the air filter 14 and, using the data regarding the use life of the air filter 14, performs diagnostic calculations to detect air filter leakage or blockage conditions. The control module 26 selectively notifies a user of the use life and/or when the air filter 14 should be changed and/or the type of leakage or blockage detected. The control module 26 notifies the user through visual, audible, and/or haptic feedback within the vehicle 10 and/or messages sent to remote devices (i.e., email messages, text messages, etc.).

In various embodiments, the sensors 22 can include an air pressure sensor 22a, a mass airflow sensor 22b, and an intake air temperature sensor 22c. As can be appreciated, one or more of the sensors may be combined into a single sensor (i.e., the air pressure sensor 22a and the mass airflow sensor 22b) or implemented as separate sensors (as shown). The air pressure sensor 22a and the mass airflow sensor 22b are positioned within the air cleaner assembly 16 at a location downstream of the air filter 14. The air pressure sensor 22a senses the air pressure of the air flowing from the air filter 14 and generates sensor signals based thereon. The mass airflow sensor 22b senses the flow of air from the air filter 14 and generates sensor signals based thereon.

The intake air temperature sensor 22c can be positioned within the air cleaner assembly 16 at a location downstream of the air filter 14 or at other locations relative to the air cleaner assembly 16. The intake air temperature sensor 22c senses a temperature of the air entering the engine 18 and generates sensor signals based thereon.

In various embodiments, the one or more vehicle systems 24 generate signals and/or messages indicating conditions of the vehicle 10. The vehicle systems 24 provide the signals and/or messages directly or indirectly through a communication bus (not shown) or other communication means. The conditions can include, for example, but are not limited to, a presence of snow or rain, a condition of a system associated with snow or rain, and a time of day or year. The one or more vehicle systems 24 can include, but are not limited to, a windshield wiper system, a temperature sensing system, a global positioning system, a vehicle calendar information system, a telematics system, etc. The control module 26 uses the signals and/or messages indicating the vehicle conditions to diagnose an air filter leakage or blockage condition, and also to determine the type of blockage (snow packing or other debris).

Figure 2:
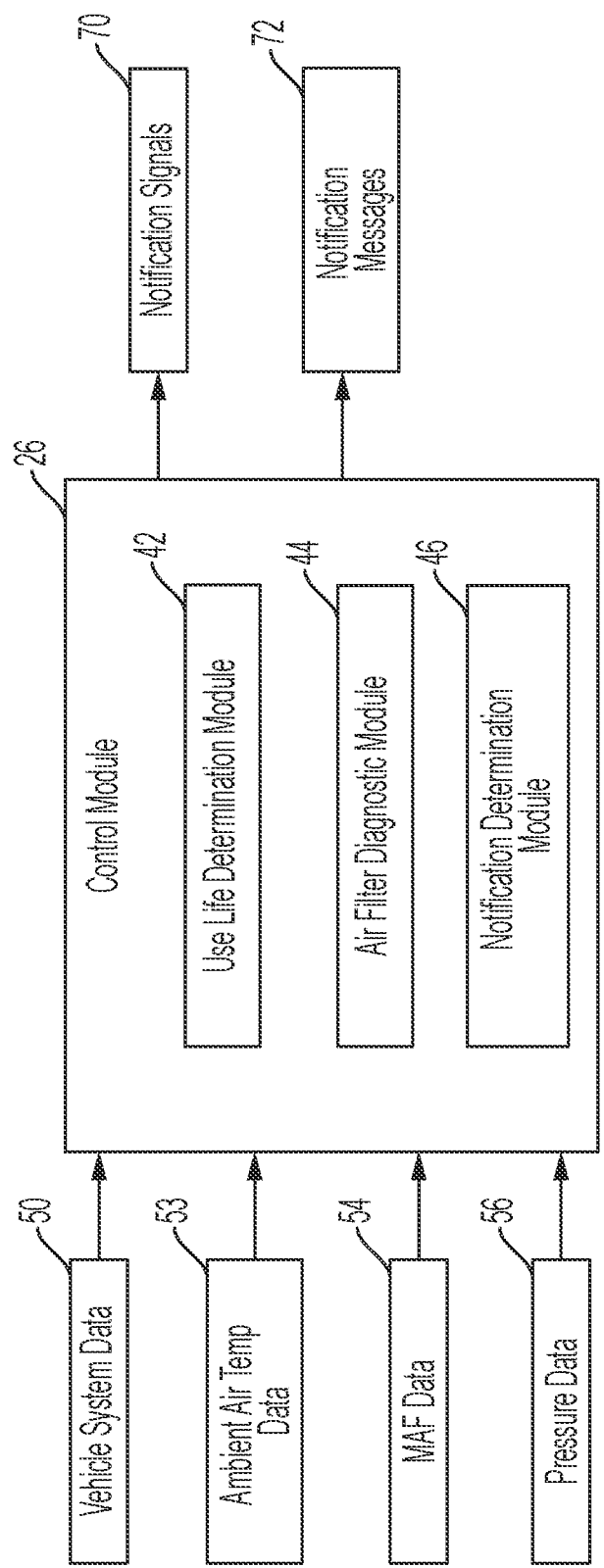
FIG. 2 is a schematic diagram of a control module of the air filter diagnostics system, according to an embodiment.

Referring now to FIG. 2, and with continued reference to FIG. 1, a schematic diagram of the control module 26 of the air filter diagnostics system illustrates various embodiments of the control module 26 in greater detail. The sub-modules shown in FIG. 2 may be combined and/or further partitioned to monitor the air filter 14 and perform diagnostic operations on the air filter 14. In various embodiments, inputs to the control module 26 are received from the sensors 22, from the vehicle systems 24, and/or determined by other sub-modules (not shown) of the control module 26.

In various embodiments, the control module 26 includes a use life determination module 42, an air filter diagnostic module 44, and a notification determination module 46. In some embodiments, the control module 26 includes additional modules and/or sub-modules that contribute to the determination of the use life of the air filter 14.

The use life determination module 42 receives as input vehicle system data 50, ambient air temperature data 53, mass air flow (MAF) data 54, and pressure data 56. U.S. Pat. No. 10,006,393, titled "Methods and Systems for Determining and Reporting a Remaining Useful Life of an Air Filter" and U.S. Pat. No. 8,626,456, titled "Methods for Determining a Remaining Useful life of an Air Filter", both of which are incorporated herein by reference in their entirety, describe methods for determining a useful life of the air filter 14. In various embodiments, an actual use life of the air filter 14 is determined from a pressure-based use life and an age-based use life, as described in the incorporated U.S. Patents.

Figure 3:
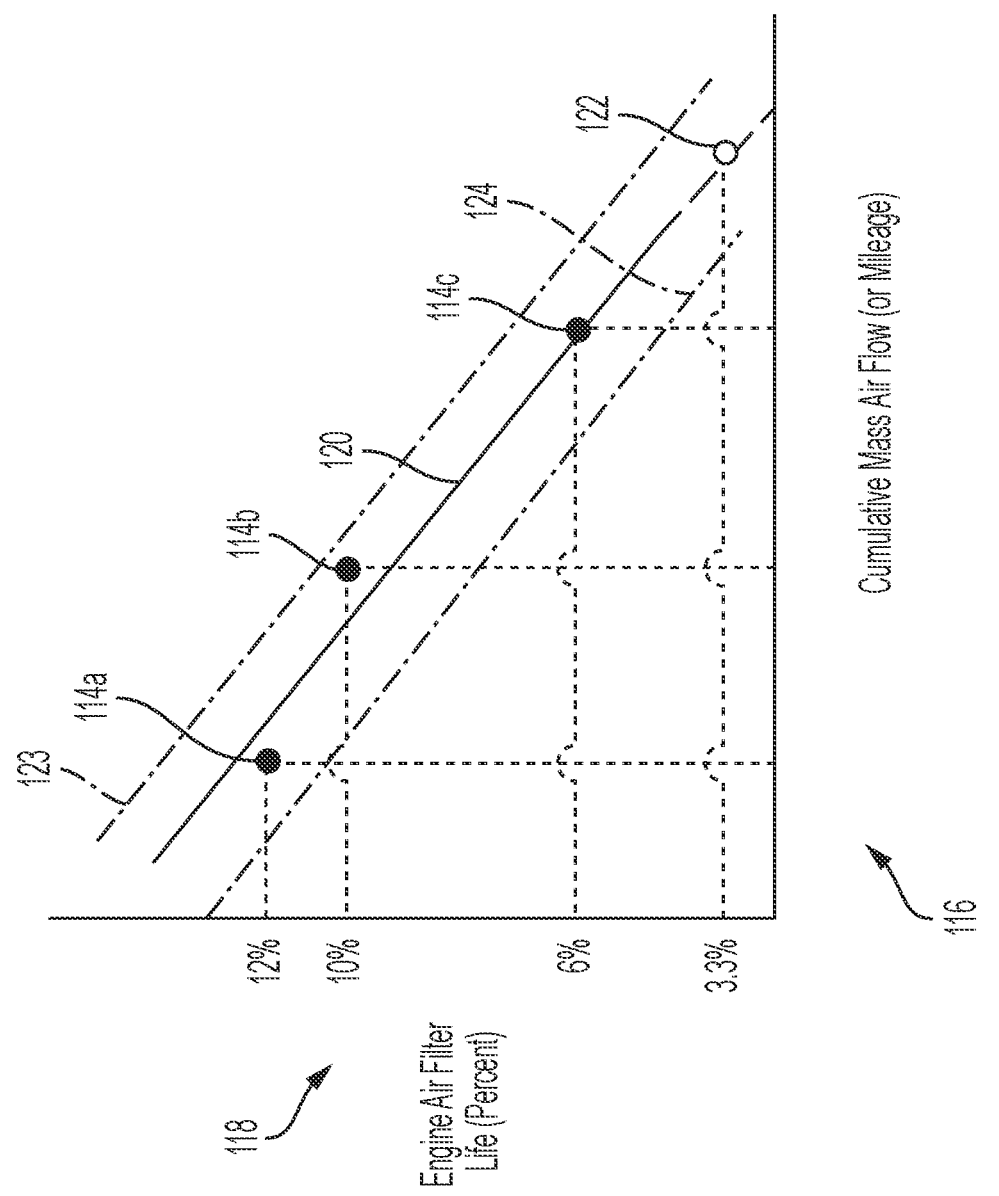
FIG. 3 is a graph illustrating data of the air filtering monitoring aspect of the air filter diagnostics system, according to an embodiment.

The air filter diagnostic module 44 receives as input a pressure-based air filter use life remaining percentage from the use life determination module 42. Additionally, a linear regression line indicating a relationship between the pressure-based air filter use life remaining percentage and vehicle condition data such as cumulative mass air flow is also input data to the air filter diagnostic module 44. For example, as shown in FIG. 3, engine air filter life (percent) at previous cumulative mass air flow or mileage events is shown at 114a-114c, where the x-axis 116 represents a cumulative mass air flow or mileage and the y-axis 118 represents air filter use life (in percent). The data 114a-114c can be used to establish a linear regression line 120. The linear regression line 120 is then used to predict an air filter use life 122 in relation to cumulative mass air flow or mileage. As can be appreciated, other vehicle condition data, such as elapsed time or distance traveled, can be used to modify the threshold as the disclosure is not limited to the present examples.

Two air filter fault threshold lines as offsets from the linear regression line are generated by the air filter diagnostic module 44. The upper fault threshold line 123 and the lower fault threshold line 124 set the boundaries for diagnosing air filter leakage and blockage conditions.

To diagnose a leakage event, the control module 26 monitors an instantaneous air filter life percentage for an anomaly. When the instantaneous air filter life percentage is greater than or equal to the upper fault threshold line 123 for at least X out of Y occurrences and is greater than or equal to the upper fault threshold line 123 for the last Z occurrences, an air filter leakage notification alert is triggered. In various embodiments, the thresholds X, Y, and Z are predetermined based on vehicle and environmental conditions, including, for example and without limitation, the vehicle type, engine type, air filter type, air filter size, sensors signal to noise, etc. In various embodiments, alternative thresholds are set to disable the alert using hysteresis. This diagnostic will detect a missing filter due to, for example and without limitation, a manufacturing defect or removal and/or tampering. This diagnostic will also detect an engine air filter breakthrough condition or hole in the filter medium material due to, for example and without limitation, a defect in material or a decomposition of the medium material over time.

To diagnose a blockage event, the control module 26 also monitors the instantaneous air filter life percentage for an anomaly. When the instantaneous air filter life percentage is equal to or below the lower fault threshold line 124 for at least x out of y occurrences and is equal to or below the lower fault threshold line 124 for the last z occurrences, an air filter blockage flag is set. In various embodiments, the thresholds x, y, and z are predetermined based on vehicle and environmental conditions, including, for example and without limitation, the vehicle type, engine type, air filter type, air filter size, sensors signal to noise, etc.

When the air filter blockage flag is set, the control module 26 determines whether some combination of vehicle or environmental conditions is satisfied. Data regarding the vehicle and environmental conditions is received from one or more of the sensors 22 and one or more of the vehicle system 24, or from other control systems of the vehicle 10. In various embodiments, these conditions include an ambient air temperature below a threshold during the y occurrences, a weather forecast in a vicinity of the vehicle 10 that indicates snow, image data in a vicinity of the vehicle 10 that includes snow, a windshield wiper in operation or set to ON for a predetermined N number of minutes during the y occurrences, the regression goodness of fit for the relationship between air filter life and cumulative mass air flow for the last YS occurrences is greater than a threshold and a first slope, m, of the regression line is less than a predetermined threshold, and the regression goodness of fit for the relationship between air filter life and the mileage of the vehicle 10 for the last YS occurrences is greater than a threshold and a second slope, n, of the regression line is less than a second predetermined threshold. The value YS represents the number of occurrences used to determine the linear regression line. If the ambient air temperature is below the predetermined threshold during the y occurrences of the instantaneous air filter life percentage or the weather forecast indicates snow or the image data includes snow, in combination with satisfaction of any or all of the regression line and wiper conditions, an air filter snow intrusion alert is triggered. If the ambient air temperature is not below the predetermined threshold during the y occurrences of the instantaneous air filter life percentage and the weather forecast does not indicate snow, and the image data does not include snow, an air filter blockage alert is triggered, indicating an air filter blockage due to some other external object such as a plastic bag, animal nest, etc., for example and without limitation. If the relationship between air filter life remaining and cumulative mass air flow for the last YS occurrences has a first slope, m, that is not less than a predetermined threshold and the relationship between the air filter life remaining and the mileage of the vehicle 10 for the last YS occurrences has a second slope, n, that is not less than a second predetermined slope, and a windshield wiper is not in operation or set to ON for a predetermined N number of minutes during the y occurrences, an air filter blockage alert is triggered, indicating an air filter blockage due to some other external object. In various embodiments, other combinations of these conditions and/or other vehicle or state conditions or vehicle telematics data, such as weather forecast telematics data, camera information, etc. are used to determine an air filter blockage due to snow intrusion.

The notification determination module 46 receives as input the actual use life of the air filter 14 as well as the diagnostic determination of the status of the air filter 14. The notification determination module 46 generates notification signals 70 and/or notification messages 72 to notify the user of the status of the air filter 14, that is, for example, a leakage condition or a blockage condition and, in various embodiments, information regarding the type of blockage. In various embodiments, the notification signals 70 and/or messages 72 include a message or other indication (e.g., audio or haptic) that it is time to service the air filter 14.

In various embodiments, the notification determination module 46 generates the notification signals 70 and/or messages 72 at a time that may be more convenient for the user. For example, the notification determination module 46 may receive as input vehicle health data and/or behavior data. The notification determination module 46 coordinates the delivery and/or content of the notification signals 70 and/or messages 72 based on the vehicle health data and/or the behavior data.

Figure 4:
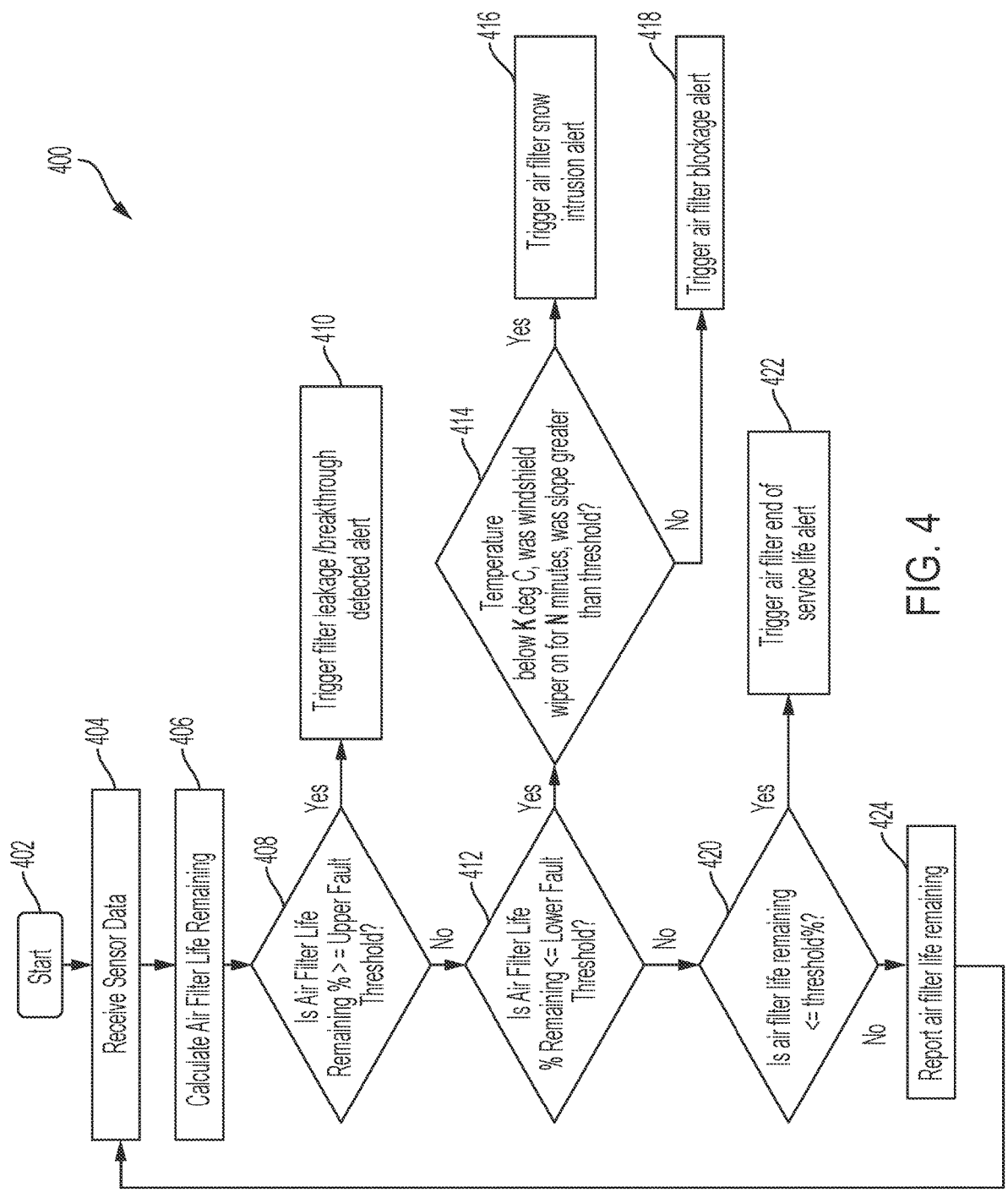
FIG. 4 is a flow chart illustrating a method for air filter diagnostics, according to an embodiment.

FIG. 4 illustrates a method 400 to diagnose an air filter leakage or blockage event. The method 400 can be utilized in connection with the control system 26 of the vehicle 10. The method 400 can be utilized in connection with the various modules of the control system 26 as discussed herein, or by other systems associated with or separate from the vehicle, in accordance with exemplary embodiments. In various embodiments, the method 400 is encoded as computer readable instructions, which, when executed by a controller or processor, cause the control or processor to perform the listed operations. The order of operation of the method 400 is not limited to the sequential execution as illustrated in FIG. 4, but may be performed in one or more varying orders, or steps may be performed simultaneously, as applicable in accordance with the present disclosure. The method 400 may be scheduled to run at predetermined time intervals during operation of the vehicle 10 and/or may be scheduled to run based on predetermined events.

The method 400 begins at 402. Next, at 404, the control module 26 receives sensor data from the plurality of sensors 22, including mass air flow rate, air temperature, and pressure, for example and without limitation.

At 406, the control module 26 calculates the air filter life remaining based on, for example and without limitation, a pressure drop across the air filter. As noted herein, the calculation of the air filter life remaining is detailed in the incorporated U.S. Pat. Nos. 8,626,456 and 10,006,393, or by any other means.

Next, at 408, an air filter leakage determination is made. Based on data received from the air filter use life determination module 42, the control module 26 evaluates the air filter life remaining percentage against the upper fault threshold 123, as shown in FIG. 3. When the air filter life remaining percentage is equal to or greater than the upper fault threshold line 123 for at least X out of Y occurrences and is equal to or greater than the upper fault threshold line 123 for the last Z occurrences, the method 400 proceeds to 410. The predetermined values X, Y, and Z are numbers indicating occurrences when the air filter life remaining percentage is determined. At 410, a filter leakage or breakthrough alert is triggered. The notification determination module 46 generates a notification signal and/or notification message as described herein. In various embodiments, the filter leakage or breakthrough alert is disabled or turned off when the air filter life remaining percentage is less than the upper fault threshold line 123 for at least X2 out of Y2 occurrences and the air filter life remaining percentage is less than the upper fault threshold line 123 for the last Z2 occurrences. The predetermined values X2, Y2, and Z2 are alternative threshold values indicating numbers of occurrences when the air filter life remaining percentage is determined and X2, Y2, and Z2 are set to disable the alert using hysteresis.

However, when the air filter life remaining percentage is greater than or equal to the upper fault threshold line 123 for fewer than X out of Y occurrences or when at least one of the last Z occurrences is less than the upper fault threshold line 123, the method 400 proceeds to 412. At 412, the control module 26 evaluates the air filter life remaining percentage against the lower fault threshold line 124, as shown in FIG. 4. When the air filter life remaining percentage is less than or equal to the lower fault threshold line 124 for at least x out of y occurrences and is less than or equal to the lower fault threshold line 124 for the last z occurrences, the method 400 proceeds to 414. The predetermined values x, y, and z are threshold values indicating occurrences when the air filter life remaining is determined and may be different from the predetermined values X, Y, and Z.

At 414, the control module 26 determines whether various vehicle and/or environmental or state conditions exist. The control module 26 makes this determination from the receipt of information from various vehicle and environmental sensors, such as the sensors 22, which include temperature sensors and image sensors, information and data from one or more of the vehicle systems 24, data from other control systems of the vehicle 10, and vehicle telematics data that includes weather forecast data, etc., for example and without limitation. As discussed herein, these conditions include an ambient air temperature below a threshold during the y occurrences, weather forecast data in a vicinity of the vehicle that indicates snow, image data of the vicinity of the vehicle including snow, a windshield wiper in operation or set to ON for a predetermined N number of minutes during the y occurrences, the regression goodness of fit for the relationship between air filter life and cumulative mass air flow for the last YS occurrences is greater than a threshold and the first slope, m, of the regression line is less than a predetermined threshold, and the regression goodness of fit for the relationship between air filter life and the mileage of the vehicle 10 for the last YS occurrences is greater than a threshold and the second slope, n, of the regression line is less than the second predetermined slope. If the ambient air temperature is below the predetermined threshold during the y occurrences of the instantaneous air filter life percentage, or when image data or weather forecast data indicates snow, in combination with satisfaction of any or all of the other conditions, the method 400 proceeds to 416 and an air filter snow intrusion alert is triggered and the notification determination module 46 generates a notification signal and/or notification message as described herein. In various embodiments, the air filter snow intrusion alert is disabled or turned off when the air filter life remaining percentage is greater than the lower fault threshold line 124 for at least x2 out of y2 occurrences and is greater than the lower fault threshold line 124 for the last z2 occurrences. The predetermined values x2, y2, and z2 are alternative threshold values indicating numbers of occurrences when the air filter life remaining percentage is determined and are set to disable the alert using hysteresis. The values x2, y2, and z2 may be different from the predetermined values x, y, and z.

However, when the ambient air temperature is not below the predetermined threshold during the prescribed number y occurrences, and the weather forecast does not indicate snow, and the image data does not include snow, the method 400 proceeds to 418 and a general air filter blockage alert is triggered and the notification determination module 46 generates a notification signal and/or notification message as described herein. When the windshield wiper is not in operation or set to ON for a predetermined N number of minutes during the y occurrences and the relationship between the air filter life remaining and the cumulative mass air flow is not less than a first predetermined slope and the relationship between the air filter life remaining and the mileage of the vehicle 10 is not less than a second predetermined slope, the method 400 also proceeds to 418. A general air filter blockage alert is triggered and the notification determination module 46 generates a notification signal and/or notification message as described herein. In various embodiments, the air filter blockage alert is disabled or turned off when the air filter life remaining percentage is greater than the lower fault threshold line 124 for at least x3 out of y3 occurrences and is greater than the lower fault threshold line 124 for the last z3 occurrences. The predetermined values x3, y3, and z3 are alternative threshold values indicating numbers of occurrences when the air filter life remaining percentage is determined and are set to disable the alert using hysteresis. The values x3, y3, and z3 may be different from the values x, y, and z and the values x2, y2, and z2.

Returning to block 412, when the air filter life remaining percentage is less than or equal to the lower fault threshold line 124 for fewer than x out of y occurrences or at least one of the last z occurrences is greater than the lower fault threshold line 124, the method 400 proceeds to 420. At 420, the control module 26 determines whether the air filter life remaining is less than or equal to a predetermined end of life threshold. In various embodiments, the air filter life remaining percentage regression line 120, shown in FIG. 3, is evaluated to determine whether the regression line crosses a filter end of life threshold. When this is true, the method 400 proceeds to 422 and an air filter end of service life alert is triggered. The notification determination module 46 generates a notification signal and/or notification message as described herein.

When the air filter life remaining is not less than or equal to a predetermined end of life threshold, the method 400 proceeds to 424 and the notification determination module 46 generates a notification signal and/or notification message as described herein, indicating the air filter life remaining. The method 400 returns to 404 and proceeds as described above.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for diagnosing an air filter status, comprising:
    receiving, by a controller, sensor data indicative of a mass air flow rate, an air temperature and an air pressure of an air cleaner assembly including an air filter;
    determining, by the controller, an air filter life remaining from the sensor data;
    receiving, by the controller, data indicative of a vehicle condition of a vehicle;
    determining, by the controller, when a first condition is satisfied;
    when the first condition is satisfied, triggering, by the controller, an air filter leakage alert;
    when the first condition is not satisfied, determining, by the controller, when a second condition is satisfied;
    when the second condition is satisfied, determining, by the controller, when a third condition is satisfied, and when the third condition is satisfied, triggering, by the controller, an air filter snow intrusion alert; and
    when the third condition is not satisfied, triggering, by the controller, an air filter blockage alert.

2. The method of claim 1, wherein the first condition is satisfied when the air filter life remaining is greater than or equal to an upper fault threshold for at least X out of Y occurrences and is greater than or equal to the upper fault threshold for a last Z occurrences.

3. The method of claim 1, wherein the second condition is satisfied when the air filter life remaining is less than or equal to a lower fault threshold for at least x out of y occurrences and is less than or equal to the lower fault threshold for a last z occurrences.

4. The method of claim 1, wherein the received data indicative of a vehicle condition includes an ambient temperature, a weather forecast in a vicinity of the vehicle, image data of the vicinity of the vehicle, a wiper blade condition, and a relationship between the air filter life remaining and a cumulative mass air flow of the air cleaner assembly and the third condition is satisfied when the ambient temperature is below a temperature threshold or the weather forecast indicates snow or the image data includes snow and the wiper blade condition indicates a windshield wiper in an ON position for a predetermined time.

5. The method of claim 1, wherein the received data indicative of a vehicle condition includes an ambient temperature, a weather forecast in a vicinity of the vehicle, image data of the vicinity of the vehicle, a wiper blade condition, and a relationship between the air filter life remaining and a cumulative mass air flow of the air cleaner assembly and the third condition is satisfied when the ambient temperature is below a temperature threshold or the weather forecast indicates snow or the image data includes snow and the relationship between the air filter life remaining and the cumulative mass air flow of the air cleaner assembly has a linear slope less than a predetermined slope.

6. The method of claim 1, wherein the received data indicative of a vehicle condition includes an ambient temperature, a weather forecast in a vicinity of the vehicle, image data of the vicinity of the vehicle, a wiper blade condition, and a relationship between the air filter life remaining and a cumulative mass air flow of the air cleaner assembly and the third condition is satisfied when the ambient temperature is below a temperature threshold or the weather forecast indicates snow or the image data includes snow, and the wiper blade condition indicates a windshield wiper in an ON position for a predetermined time, and the relationship between the air filter life remaining and the cumulative mass air flow of the air cleaner assembly has a linear slope less than a predetermined slope.

7. The method of claim 1 further comprising generating, by the controller, a notification to an operator of the air filter leakage alert when the first condition is satisfied.

8. The method of claim 1 further comprising generating, by the controller, a notification to an operator of the air filter snow intrusion alert when the second and third conditions are satisfied.

9. The method of claim 1 further comprising generating, by the controller, a notification to an operator of the air filter blockage alert when the second condition is satisfied and the third condition is not satisfied.

10. The method of claim 1 further comprising determining, by the controller, when a fourth condition is satisfied and when the fourth condition is satisfied, triggering, by the controller, an air filter end of service life alert, wherein the fourth condition is satisfied when the air filter life remaining is less than or equal to a predetermined end of filter life threshold.

11. A system for diagnosing an air filter status, comprising:
    a first module that, by a controller, receives sensor data indicative of a mass air flow rate, an air temperature, and an air pressure of an air cleaner assembly including an air filter and selectively computes an air filter life remaining based on the sensor data;
    a second module that, by the controller, determines one of a leakage and a blockage condition by comparing the air filter life remaining to an upper fault threshold and to a lower fault threshold to determine when an air filter leakage condition, an air filter snow intrusion condition, or an air filter blockage condition exists, wherein determining when the air filter snow intrusion condition exists further comprises receiving and evaluating data regarding one or more of an ambient temperature, a weather forecast in a vicinity of the system, image data in the vicinity of the system, a wiper blade condition, and a relationship between the air filter life remaining and a cumulative mass air flow of the air cleaner assembly; and a third module that, by the controller, selectively generates at least one of a notification signal and a notification message based on the determined one of the leakage and the blockage condition.

12. The system of claim 11, wherein comparing the air filter life remaining to the upper fault threshold comprises determining when the air filter life remaining is greater than or equal to the upper fault threshold for at least X out of Y occurrences and is greater than or equal to the upper fault threshold for a last Z occurrences, and when true, triggering an air filter leakage alert.

13. The system of claim 11, wherein comparing the air filter life remaining to the lower fault threshold comprises determining when the air filter life remaining is less than or equal to the lower fault threshold for at least x out of y occurrences and less than or equal to the lower fault threshold for a last z occurrences, and when true, determining when some combination of state conditions are satisfied.

14. The system of claim 13, wherein the state conditions include the ambient temperature is below a temperature threshold, the weather forecast in the vicinity of the system includes snow, the image data in the vicinity of the system includes snow, the wiper blade condition indicates that a windshield wiper is in an ON position for a predetermined time, and the relationship between the air filter life remaining and the cumulative mass air flow of the air cleaner assembly has a linear slope less than a predetermined slope.

15. An automotive vehicle, comprising:
an air cleaner assembly including an air filter;
at least one air filter sensor configured to sense a mass air flow rate, an air temperature, and a pressure condition of the air cleaner assembly;
at least one vehicle sensor configured to sense a vehicle condition;
at least one environmental sensor configured to sense an environmental condition in a vicinity of the vehicle; and
a controller electronically coupled to the at least one air filter sensor, the at least one vehicle sensor, and the at least one environmental sensor, the controller configured to:
receive sensor data from the at least one air filter sensor indicative of a mass air flow rate, an air temperature, and an air pressure of the air cleaner assembly;
determine an air filter life remaining from the sensor data;
receive data indicative of the vehicle condition from the at least one vehicle sensor and receive data indicative of the environmental condition from the at least one environmental sensor, wherein the received data includes one or more of an ambient temperature, a weather forecast in a vicinity of the automotive vehicle, image data in the vicinity of the automotive vehicle, a wiper blade condition, a relationship between the air filter life remaining and a cumulative mass air flow of the air cleaner assembly, and a relationship between the air filter life remaining and a mileage of the automotive vehicle;
determine when a first condition is satisfied;
when the first condition is satisfied, trigger an air filter leakage alert;
when the first condition is not satisfied, determine when a second condition is satisfied;
when the second condition is satisfied, determine when a third condition is satisfied, and when the third condition is satisfied, trigger an air filter snow intrusion alert; and
when the third condition is not satisfied, trigger an air filter blockage alert.

16. The automotive vehicle of claim 15, wherein the first condition is satisfied when the air filter life remaining is greater than or equal to an upper fault threshold for at least X out of Y occurrences and is greater than or equal to the upper fault threshold for a last Z occurrences, and wherein the second condition is satisfied when the air filter life remaining is less than or equal to a lower fault threshold for at least x out of y occurrences and is less than or equal to the lower fault threshold for a last z occurrences.

17. The automotive vehicle of claim 15, wherein the third condition is satisfied when the ambient temperature is below a temperature threshold or the weather forecast in the vicinity of the automotive vehicle includes snow or the image data in the vicinity of the automotive vehicle includes snow and the wiper blade condition indicates a windshield wiper in an ON position for a predetermined time.

18. The automotive vehicle of claim 15, wherein the third condition is satisfied when the ambient temperature is below a temperature threshold or the weather forecast in the vicinity of the automotive vehicle includes snow or the image data in the vicinity of the automotive vehicle includes snow and the relationship between the air filter life remaining and the cumulative mass air flow of the air cleaner assembly has a linear slope less than a first predetermined slope or the relationship between the air filter life remaining and the mileage of the automotive vehicle has a linear slope less than a second predetermined slope.

19. The automotive vehicle of claim 15, wherein the third condition is satisfied when the ambient temperature is below a temperature threshold or the weather forecast in the vicinity of the automotive vehicle includes snow or the image data in the vicinity of the automotive vehicle includes snow, and the wiper blade condition indicates a windshield wiper in an ON position for a predetermined time, and the relationship between the air filter life remaining and the cumulative mass air flow of the air cleaner assembly has a linear slope less than a predetermined slope.

20. The automotive vehicle of claim 15, wherein the controller is further configured to generate a notification to an operator of the air filter leakage alert when the first condition is satisfied, generate a notification to an operator of the air filter snow intrusion alert when the second and third conditions are satisfied, and generate a notification to an operator of the air filter blockage alert when the second condition is satisfied and the third condition is not satisfied.

\* \* \* \* \*